United States Patent [19]
Hisada

[11] 3,902,726
[45] Sept. 2, 1975

[54] STERN TUBE SEALING DEVICE

[75] Inventor: Naoji Hisada, Toyama, Japan

[73] Assignee: Chuetsu Waukesha Co., Ltd., Tokyo, Japan

[22] Filed: Mar. 15, 1974

[21] Appl. No.: 451,680

[52] U.S. Cl. ............... 277/58; 277/167.5; 277/187; 277/169
[51] Int. Cl.² .......................................... F16J 9/00
[58] Field of Search ............. 277/58, 187, 9, 167.5, 277/169, 59; 285/336

[56] References Cited
UNITED STATES PATENTS

| | | | |
|---|---|---|---|
| 2,789,844 | 4/1957 | Kessler | 277/169 X |
| 3,563,555 | 2/1971 | Koons | 277/9 |
| 3,773,336 | 11/1973 | Walter et al. | 277/187 |

*Primary Examiner*—Samuel B. Rothberg
*Attorney, Agent, or Firm*—Armstrong, Nikaido & Wegner

[57] ABSTRACT

A stern tube sealing device comprising three or more than three detachably assembled annular casings and seal ring retaining rings is disclosed which may be easily disassembled for inspection and replacement of its seal rings without a screw propeller being detached from its shaft. The deformation of the seal rings caused when their outer peripheral edges are clamped in position between the annular casings and retaining rings may be absorbed not only in the annular grooves substantially semicircular in cross section formed in the opposing surfaces of the annular casings and retaining rings but also in the annular spaces formed radially outwardly of the outer peripheral portions of the seal rings, so that the deformation of the lips of the seal rings are prevented and the sealing effect by the lips, which are made into contact with a lining fitted over a propeller shaft, will not be adversely affected.

3 Claims, 4 Drawing Figures

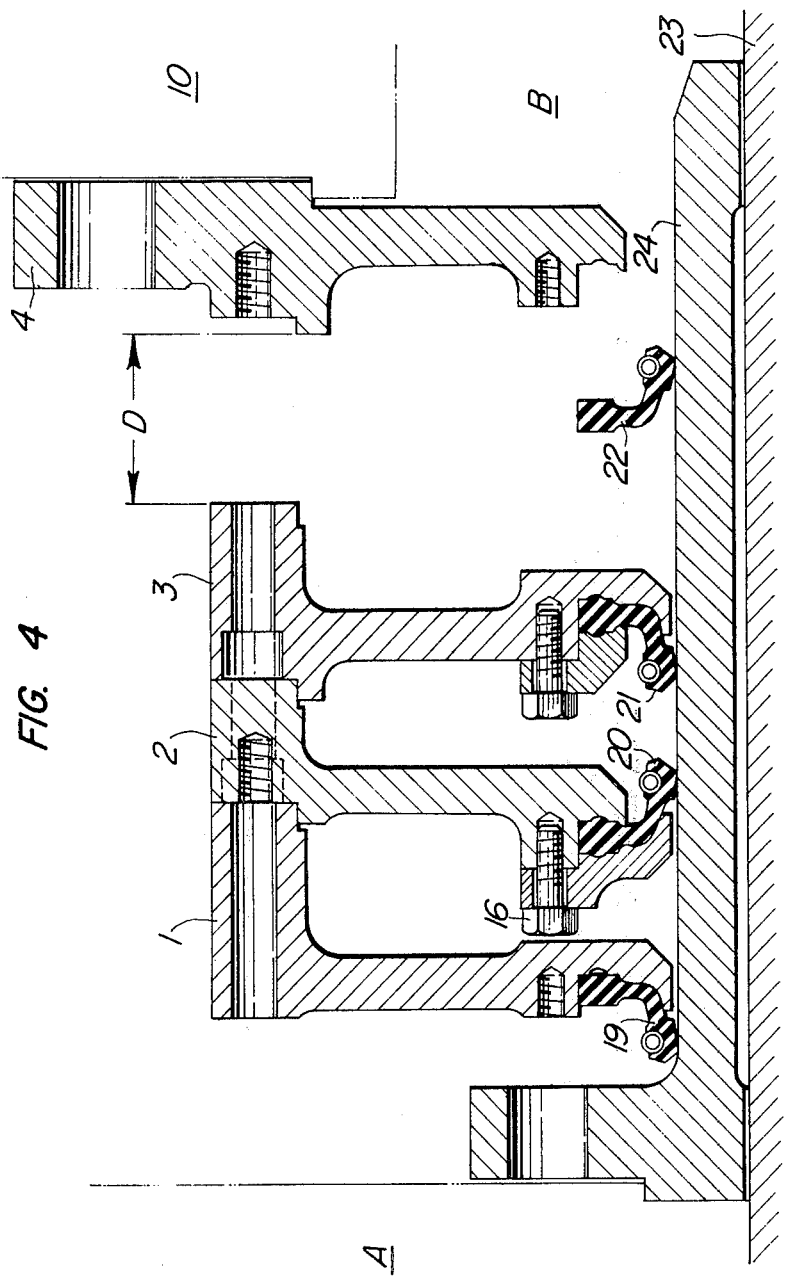

STERN TUBE SEALING DEVICE

The present invention relates to a stern tube sealing device.

As a ship is increased in size and propulsion output, the combination of a stern tube bearing of oil-bath type employing a white metal bearing and a stern tube sealing device is used widely.

However, in the conventional stern tube sealing devices, the clamping of a seal ring causes the deformation of its lip so that the sealing effect of the devices is adversely affected. Furthermore, the casing of the conventional stern tube sealing device is formed as a unitary construction so that there is not a sufficient space available for repair and replacement of a damaged seal ring. Thus, the inspection and replacement of damaged seal rings are very difficult. Moreover, when the inspection and replacement are made, a propeller must be detached from its shaft or the assembly of a propeller and a propeller shaft must be displaced to the stern. Thus, the inspection and replacement of seal rings in the conventional stern tube sealing devices are very expensive and cumbersome.

One of the objects of the present invention is therefore to provide a stern tube sealing device in which the deformation of a seal ring caused when it is clamped at the peripheral portion may be so satisfactorily absorbed that the deformation of its lip in contact with a liner may be prevented.

Another object of the present invention is to provide a stern tube sealing device whose seal rings may be inspected and replaced without a propeller being detached from its shaft.

According to the present invention, there is provided a stern tube sealing device comprising three or more than three annular casings detachably assembled with each other and with a stern tube bearing; a retaining ring detachably fixed to each of said annular casings in such a way that an annular space substantially rectangular in cross section may be defined therebetween; a seal ring whose outer peripheral portion substantially rectangular in cross section is clamped between said retaining ring and its associated annular casing in said annular space defined therebetween; annular grooves substantially semicircular in cross section formed in the opposing surfaces of said retaining ring and its associated annular casing; the width in the axial direction of said peripheral portion of each seal ring which has been completely clamped between said retaining ring and its associated annular casing being 80 – 95 percent of its initial width; and the lip of said seal ring being made into close contact with a liner fitted over a propeller shaft.

The present invention will become more apparent from the following description of preferred embodiments thereof taken in conjunction with the accompanying drawings in which:

FIG. 4 is a longitudinal sectional view of the stern tube sealing device shown in FIG. 1 and partly disassembled for inspection and replacement of the seal ring.

Figure 1:
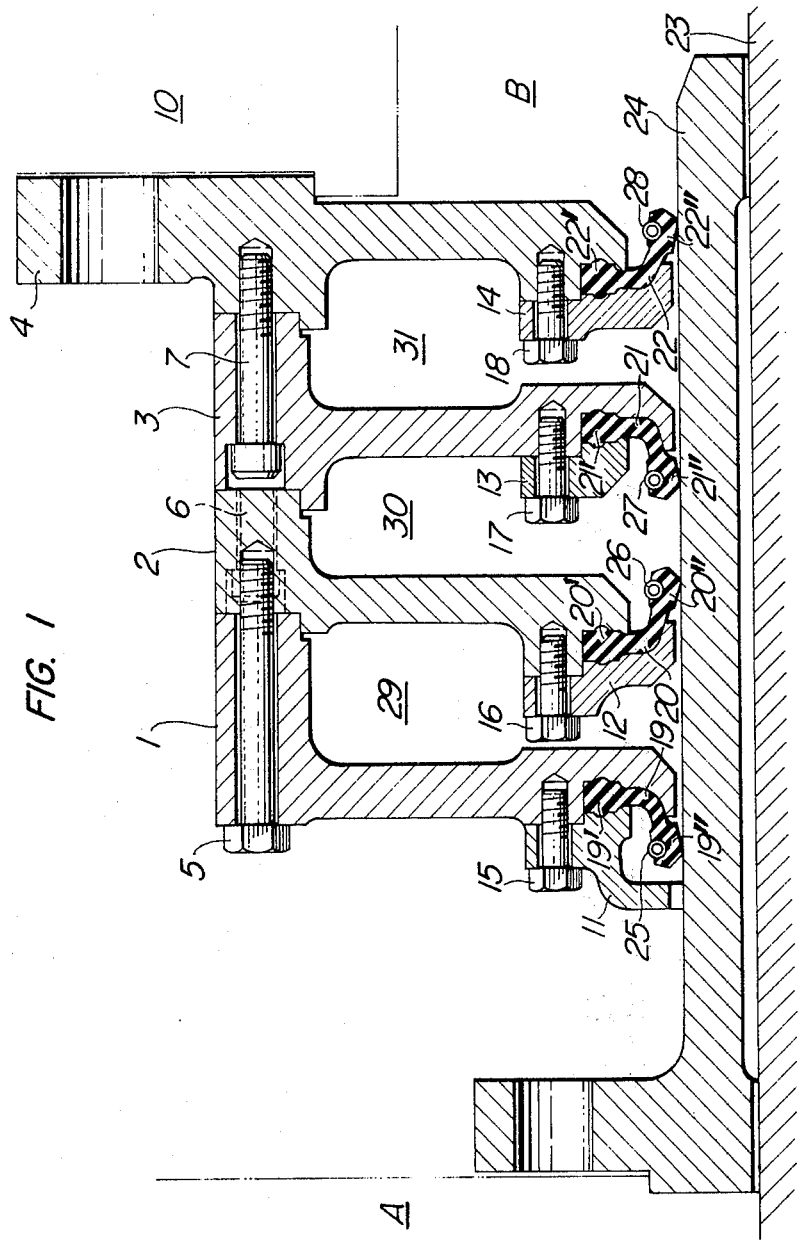
FIG. 1 is a longitudinal sectional view of a stern tube sealing device in accordance with the present invention.

In FIG. 1, reference numerals 1, 2, 3 and 4 denote annular casings. The casings 1, 2 and 3 are securely fixed to the casings 2, 3 and 4 with bolts 5, 6 and 7, respectively, and the casing 4 is securely fixed to a stern frame or tube 10 in a known manner. Retaining rings 11, 12, 13 and 14, each of which may be a unitary construction or may be of the split type, are securely fixed to the annular casings 1, 2, 3 and 4 with bolts 15, 16, 17 and 18, respectively. Thus, four spaces substantially rectangular in cross section may be defined between the annular casings 1, 2, 3 and 4 and the retaining rings 11, 12, 13 and 14. The outer peripheral portions 19', 20', 21' and 22' of seal rings 19, 20, 21 and 22 which portions are substantially rectangular in cross section are firmly clamped in position between the annular casings 1, 2, 3 and 4 and the retaining rings 11, 12, 13 and 14, respectively. The seal rings 19, 20, 21 and 22 are all formed from rubber.

The lips 19'', 20'', 21'' and 22'' of the seal rings 19, 20, 21 and 22 are made into close contact with a liner 24 fitted over a propeller shaft 23 to provide the fluid-tightness for the stern tube. As best shown in FIG. 1, the lips 19'', 20'', 21'' and 22'' are alternately reversed in direction, and are pressed against the liner 24 under the forces of annular springs 25, 26, 27 and 28, respectively.

A propeller is disposed in the space A while the stern tube bearing, in the space B which is filled with lubricating oil. Between the annular casings 1 – 4 are defined lubricating oil chambers 29, 30 and 31 which are fluid-tightly separated from each other by means of the seal rings 20 and 21. The seal ring 19 serves to fluid-tightly seal the oil chamber 29 from the sea water outside of the stern tube sealing device, and the seal ring 22, the oil chamber 31 from the stern tube bearing.

Figure 2:
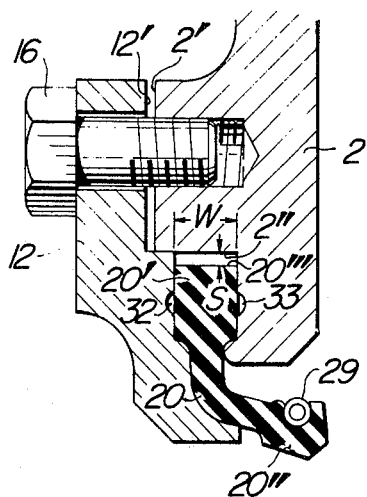
FIG. 2 is a fragmentary sectional view thereof, on enlarged scale, illustrating a seal ring which is inserted, but not clamped in position between an annular casing and a retaining ring.
Figure 3:
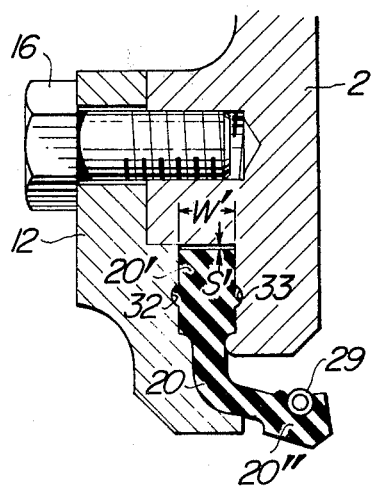
FIG. 3 is a view similar to FIG. 2, but illustrates the seal ring completely clamped in position.

FIG. 2 illustrates, on enlarged scale, the seal ring 20 the outer peripheral portion 20' of which is inserted, but not yet clamped between the annular casing 2 and the retaining ring 12, and FIG. 3 illustrates the outer peripheral portion 20' as shown in FIG. 2 which has been completely clamped in position as the bolts 16 are tightened. More particularly, as the bolts 16 are tightened, the inner surface 12' of the retaining ring 12 approaches its mating surface 2' of the annular casing 2, and when the mating surfaces 12' and 2' are made into contact with each other, it becomes impossible to tighten the bolts 16 any longer. Since the mating surfaces 12' and 2' are formed according to the present invention, the damages to the seal rings, which are caused by the overtightening of the clamping bolts in the prior art devices, may be completely eliminated.

The initial width W in the axial direction of the peripheral edge 20' of the seal ring 20 is reduced to W' after the seal ring 20 has been completely clamped in position so that the resultant resilient force of the seal ring 20 serves to enhance the fluid-tight sealing between the casing 2 and the retaining ring 12. It is preferable to determine W' about 80 – 95 percent of the initial width W. Annular grooves 32 and 33 substantially semicircular in cross section are formed in the opposing surfaces of the casing 2 and the retaining ring 12, respectively. An annular space which is defined between the peripheral side 20''' of the portion 20' of the seal ring 20 and the opposing surface 2" of the annular casing 2 has a length S in the radial direction when the clamping bolts 16 are not fastened. This length S is reduced to S' which is substantially equal to zero, when the outer peripheral portion 20' has been completely clamped in position. More particularly, when the clamping bolts 16 are tightened, the portion 20' of the seal ring 20 is deformed and partially protrudes into the annular space having the length S in the radial direction and into the annular grooves 32 and 33. Thus, the deformation of the peripheral portion 20' of the seal ring 20 will not cause any deformation of the lip 20', which is in close contact with the liner 24, so that the sealing effect will not be adversely affected at all. The construction, assembly and sealing effect of the seal rings 19, 21 and 22, the annular casings 1, 3 and 4 and the retaining rings 11, 13 and 14 are similar to those described above.

Next referring to FIG. 4, the method for inspecting, repairing of replacing seal rings without removing the propeller will be described. In FIG. 4, the same reference numerals are given to the parts and members similar to those in FIG. 1. In order to inspect, repair or replace the seal ring 22, the split retaining ring 11 is first removed. However, when the retaining ring 11 is not of the split type, it is not removed. Next the clamping bolts 5, 6 and 7 are loosened and removed so that the casing 3 as well as the component parts close to the propeller are displaced toward the propeller as near as possible. Thereafter the retaining ring 14 is detached. Thus the stern tube sealing device is partly disassembled as shown in FIG. 4, so that the inspection, repair or replacement of the seal ring 22 may be easily carried out because the sufficient spacing D is available without removing the propeller. The inspection, repair or replacement of other seal rings 19, 20 and 21 may be carried out in a manner substantially similar to that described above.

In the instant embodiment, the stern tube sealing device has been described as comprising four annular casings 1 – 4, but it is to be understood that the stern tube sealing device in accord with the present invention may comprise three or more than three annular casings.

What is claimed is:

1. A stern tube sealing device comprising:
   a. at least three annular casings detachably assembled with each other and with a stern tube bearing, each annular casing extending in a radial direction such that at least two lubricating oil chambers are formed between adjacent ones of said annular casings, each chamber extending in a radial direction to a greater extent than in an axial direction;
   b. a retaining ring detachably fixed to each of said annular casings such that an annular space substantially rectangular in cross section is defined therebetween, wherein relatively small annular grooves substantially semicircular in cross section are formed in the opposing surfaces of said retaining ring and its associated annular casing; and
   c. a seal ring, having an outer peripheral portion substantially rectangular in cross section, clamped between each said retaining ring and its associated annular casing in said annular space defined therebetween, wherein the width in the axial direction of said peripheral portion of each seal ring clamped between each said retaining ring and its associated annular casing is 80-95% of its initial width, and wherein the lip of said seal ring closely contacts a liner fitted over a propeller shaft.

2. A stern tube sealing device as defined in claim 1 wherein an annular space is formed radially outwardly of said peripheral portion of each seal ring when said portion is inserted, but not clamped between said annular casing and its associated retaining ring; and said annular space may be substantially eliminated when said peripheral portion is completely clamped in position between said annular casing and its associated retaining ring.

3. A stern tube sealing device as defined in claim 1 wherein at least one of said retaining rings is of split type.

* * * * *